(12) United States Patent
Pelly et al.

(10) Patent No.: US 7,110,566 B2
(45) Date of Patent: Sep. 19, 2006

(54) MODIFYING MATERIAL (75) Inventors: Jason Charles Pelly, Reading (GB); Stephen Mark Keating, Reading (GB)

(73) Assignee: Sony United Kingdom Limited, Weybridge (GB)

( * ) Notice: Subject to any disclaimer, the term of this patent is extended or adjusted under 35 U.S.C. 154(b) by 1006 days.

(21) Appl. No.: 10/006,050

(22) Filed: Dec. 6, 2001

(65) Prior Publication Data

US 2002/0114463 A1 Aug. 22, 2002

(30) Foreign Application Priority Data

Dec. 7, 2000 (GB) .................. 0029850.5
Aug. 31, 2001 (GB) .................. 0121197.8

(51) Int. Cl.
*G06K 9/00* (2006.01)

(52) U.S. Cl. .................. 382/100; 382/232; 380/51

(58) Field of Classification Search ................ 382/100, 382/232; 380/51, 54, 40, 41; 386/94, 95, 386/64
See application file for complete search history.

(56) References Cited

U.S. PATENT DOCUMENTS

| 5,530,759 | A | | 6/1996 | Braudaway et al. |
| 5,809,139 | A | | 9/1998 | Girod et al. |
| 5,930,369 | A | * | 7/1999 | Cox et al. ...................... 380/54 |
| 6,061,793 | A | | 5/2000 | Tewfik et al. |
| 6,192,138 | B1 | * | 2/2001 | Yamadaji .................... 382/100 |
| 6,310,962 | B1 | * | 10/2001 | Chung et al. ............... 382/100 |
| 6,341,350 | B1 | * | 1/2002 | Miyahara et al. ........... 713/176 |
| 6,549,666 | B1 | * | 4/2003 | Schwartz .................... 382/233 |

FOREIGN PATENT DOCUMENTS

| WO | WO 97 48084 | 12/1997 |
| WO | WO 99 10837 | 3/1999 |

OTHER PUBLICATIONS

Hartung F et al: "Watermarking of uncompressed and compressed video" Signal Processing. European Journal Devoted to the Methods and Applications of Signal Processing, Elsevier Science Publishers B.V. Amsterdam, NL, vol. 66, No. 3, May 28, 1998, pp. 283-301, XP004124953 ISSN: 0165-1684.

* cited by examiner

*Primary Examiner*—Bhavesh M. Mehta
*Assistant Examiner*—John Strege
(74) *Attorney, Agent, or Firm*—Oblon, Spivak, McClelland, Maier & Neustadt, P.C.

(57) ABSTRACT

Material is represented by transform coefficients represented by digital numbers. A method of perceptibly watermarking the material comprises the steps of: changing representations of the said numbers according to an invertible algorithm without changing the number of bits in the said numbers; and encoding the changed n bit numbers to effect compression encoding of the material.

82 Claims, 8 Drawing Sheets

TEMPLATE STORE

FIG. 3A

CHANGE FUNCTION STORE

EXAMPLE WATERMARKED IMAGE

FIG. 14

MODIFYING MATERIAL

BACKGROUND OF THE INVENTION

1. Field of the Invention

The present invention relates to modifying material. Preferred embodiments of the invention relate to perceptible modification.

"Material" as used herein means information material which includes at least one or more of image material, audio material and data material. Image material is generic to still and moving images and includes video and other forms of information signals representing images.

2. Description of the Prior Art

It is known to watermark material. A watermark may be data embedded in material as a watermark. A watermark may be perceptible or hidden. Preferred embodiments of the present invention use perceptible watermarks.

It is also known to watermark an image by transforming the image from the spatial domain to a transform domain, e.g. to the wavelet domain and embed a watermark by changing the wavelet coefficients. The transform domain image with the watermark is then inverse transformed to the spatial domain. See for example "An image watermarking method based on the wavelet transform" by Hisashi Inoue, et al, IEEE, 0-7803-5467-2/99.

U.S. Pat. No. 5,809,139 (Girod et al) discloses the invisible watermarking of video material which is already compressed. Video which has been compressed by MPEG2 is entropy decoded and dequantised to obtain the DCT coefficients. A spread spectrum spatial domain watermark is transformed to the DCT domain and the transformed watermark added to the DCT coefficients of the transformed video. To maintain the bit rate of the compressed video even with the addition of the watermark, various steps are taken. Only non-zero coefficients are modified. Also the number of bits of an encoded watermarked coefficient is compared against the number of bits of the coefficient prior to watermarking (plus any extra number of spare bits saved in previous coding operations). A control controls selection of the output between the watermarked bitstream and the original unwatermarked bitstream. If an entropy encoded unwatermarked coefficient uses $n_0$ bits and the watermarked entropy encoded coefficient uses $n_1$ bits then a watermarked coefficient is output if $n_1 <= n_0 + n_3$, where $n_3$ is the number of spare bits available for use. The watermark can be detected in a video decoder but it is not possible to restore the watermarked video to the original video by reversing the watermarking algorithm.

WO 99/10837 (Digimarc) discloses a method of watermarking a video image in which the image is compressed using for example MPEG2 and the DCT coefficients are modified to embed a watermark. The bit rate is preserved by maintaining a count that represents the amount the bit rate has been increased by the modifications to the coefficients less the amount the bit rate has been decreased by the modifications. If the cumulative change exceeds a positive or negative limit, then no further changes are made. The watermark can be detected in a video decoder but it is not possible to restore the watermarked video to the original video by reversing the watermarking algorithm.

Both U.S. Pat. No. 5,809,139 and WO 99/10837 require means which monitor the bit rate and which stops embedding of a watermark if a specified limit is reached. For U.S. Pat. No. 5,809,139 and WO 99/10837 that results in a random distribution of the watermark in an image. These proposals are aimed at irreversible imperceptible watermarks which embed data representing a message in the image.

It is known to compression encode material especially images. Also, if a modification is made to the material which adds data to the material, then the compression is usually less efficient. It is desirable to process compressed material, so as to produce modification of the material which is perceptible in the decompressed material, e.g. a visible modification in an image, with a minimal change to the number of bits representing the compressed material. Preferably it is desirable to modify material in a way which is easily applicable to both material which is already compressed and material which is to be compressed.

SUMMARY OF THE INVENTION

According to one aspect of the present invention, there is provided a method of modifying material represented by information signals, comprising deriving digital representations of transform coefficients of the signals, and modifying and entropy encoding the digital representations, wherein at least some of the digital representations are modified by making pseudo random changes to them in accordance with a substantially invertible algorithm, which changes do not substantially change the number of entropy encoded bits.

The term "not substantially change the number of entropy encoded bits" indicates that the number of bits may increase or decrease by a small amount relative to the number of bits of entropy encoded unmodified material and preferably the number of bits does not change.

"Pseudo random changes" may be applied by encrypting, transposing or permuting the bits of coefficients or groups of coefficients in accordance with pseudo random numbers derived from keys.

The method is easily applicable to both compressed and uncompressed material because it is applied to transformed coefficients. That is particularly advantageous for compressed material having a bit stream containing codes representing the coefficients because only extraction of the codes from the entropy encoded bitstream is needed before a modification is made. By modifying according to an invertible algorithm, the modification may be removed and the original material restored which is not possible in the prior proposals of Girod and Digimarc as described above.

Some embodiments of the invention apply a modification by transposing the values of representations with other values in accordance with a transposition algorithm. By suitably choosing the values which are transposed, the use of such transposition allows material to be modified without substantial change to the number of entropy encoded bits. Preferably, the number of bits does not increase. However in some circumstances, there may be a small increase or decrease in the number of bits.

In an embodiment of the invention which compresses material, by combining the application of the modification and compression, the compression does not damage the modification. Also by not substantially changing the number of bits used, the bandwidth (data rate) of the compressed and modified material is not substantially changed.

By using an invertible algorithm, the modification is removable and the original material restored provided that the modified material is not processed or otherwise altered in a way that irreversibly alters the changed compression encoded data.

The invention also provides apparatus for carrying out the method of said one aspect.

Another aspect of the invention provides a method of removing modifications applied to information signals representing material by the method of said one aspect, comprising deriving a bitstream representing entropy encoded digital representations of transform coefficients of the modified material, and extracting from the bitstream codes the coefficients and applying the inverse of the invertible algorithm thereto.

The invention also provides a computer program product arranged to implement the method of the said another aspect when run on a computer.

The invention also provides apparatus for carrying out the method of said another aspect.

It will be appreciated from the following description that the illustrative embodiments of the invention do not embed data representing a message in the material. The embodiments change selected coefficients or blocks of coefficients dependent on a bit map. The bit map may represent a pattern. However, the modifications made at the positions indicated by the bit map do not represent intelligible data.

BRIEF DESCRIPTION OF THE DRAWINGS

The above and other objects, features and advantages of the invention will be apparent from the following detailed description of illustrative embodiments which is to be read in connection with the accompanying drawings, in which.

DESCRIPTION OF THE PREFERRED EMBODIMENTS

Overview

Figure 13:
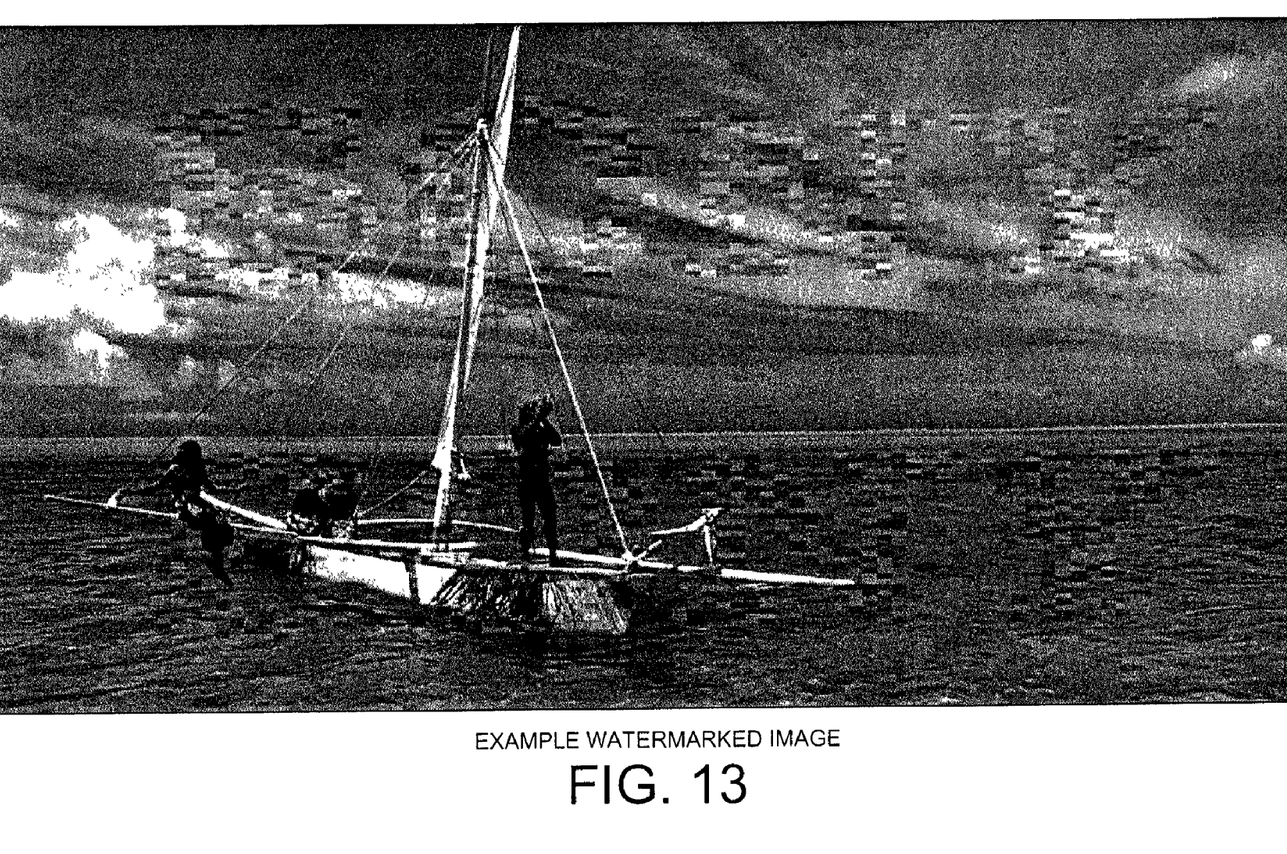
FIG. 13 an example of a watermarked image produced in accordance with the invention.

The embodiments of the invention described herein apply modifications, herein referred to as a watermark, to an image. FIG. 13 is an example of a watermarked image produced by an embodiment of the invention. As will become apparent from the following illustrative description, although the overall effect of the modifications shown in FIG. 13 is a pattern of an intelligible shape (SONY), the modifications themselves do not represent data. Furthermore the pattern itself need not be intelligible Encoder, FIG. 1

Figure 1:
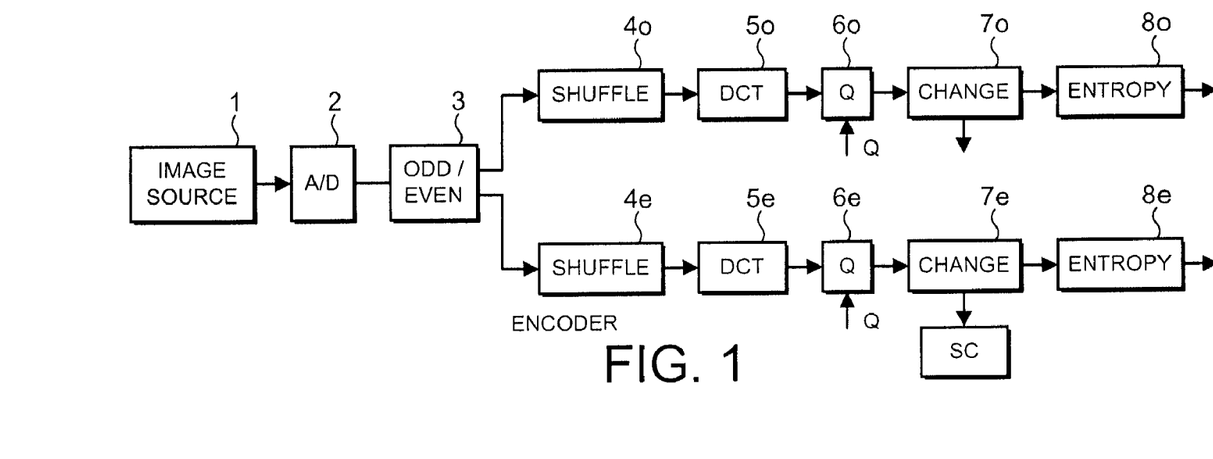
FIG. 1 is a schematic block diagram of a video signal processor embodying the invention.
Figure 2:
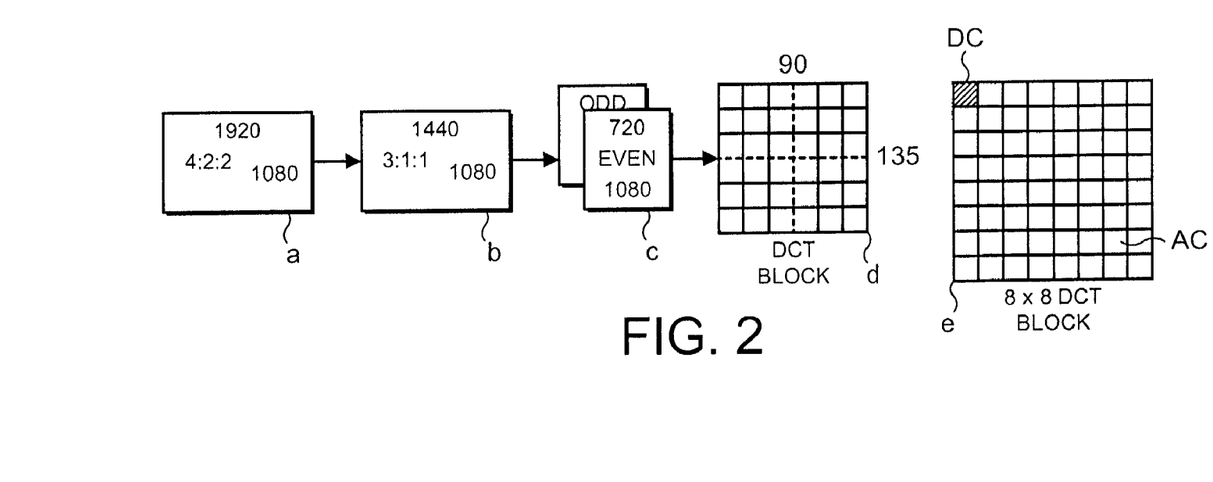
FIG. 2 explains how an image is changed by the processing of the system of FIG. 1.

FIG. 1 is an example of an encoder. The encoder of FIG. 1 is for example a high definition camera/recorder which includes an image compression system. The encoder comprises a source 1 of a color analogue image and an analogue to digital converter and processor 2 which samples the image according to the well known 4:2:2 format. As shown in FIG. 2, a frame of the luminance component image has 1920 samples in each of 1080 lines. The processor 2 filters the image and outputs a 3:1:1 subsampled image. The luminance (Y) component has 1440 digital samples on each of 1080 lines as shown in FIG. 2b. A demultiplexer 3 separates odd and even samples onto separate odd and even channels. Thus as shown in FIG. 2c, a frame of even Y samples has 720 samples on each of 1080 lines. A frame of odd samples is the same.

In this example, the encoder is part of a camera/recorder. Blocks of odd and even samples corresponding to DCT blocks described below are shuffled according to a known shuffling algorithm in processors 4o and 4e. The odd and even samples are recorded on separate tracks of a video tape in known manner. Shuffling is performed to minimise the effect of tape defects on an image reproduced from the tape. as is well known in the art. Shuffling is also used to improve shuttle playback. Shuffling is not essential to the invention.

Each frame of odd and even shuffled digital samples, represents a spatial domain image. The odd and even frames are transformed to the DCT domain by respective transformers 5o and 5e. As shown in FIG. 2d, each transformed frame of odd or even Y samples comprises 90 by 135 DCT blocks, each block comprising 8 by 8 DCT coefficients as shown in FIG. 2e. Each DCT block has one DC coefficient denoted DC in FIG. 2e and 63 AC coefficients, one example of which is denoted by AC in FIG. 2e.

The DCT coefficients are quantised in quantisers 6o and 6e, the quantisation being controlled by a control value Q in known manner. In the absence of watermarking, the odd and even frames of quantised DCT coefficients are entropy encoded in entropy encoders 8o and 8e in known manner. The entropy encoding in this example includes encoding using Huffman encoding. The entropy encoded quantised coefficients are in this example recorded in known manner on a tape: that is not shown in FIG. 1. Recording could be on other recording media, for example discs.

Modifying the Quantised DCT Coefficients to Apply the Watermark

The odd and even channels of the encoder have change processors 7o and 7e which modify the quantised luminance (Y) DCT coefficients to apply the watermark. The following description refers to only one, 7, of the processors. The other processor operates in the same way. The following assumes by way of example that the quantised DCT coefficients are represented by n bit numbers where n is in the range 8 to 14; that is DC coefficients may have 8 to 14 bits; and AC coefficients have 14 bits. For ease of description the following refers to n bit numbers.

Defining the Form of the Watermark

Figure 3A:
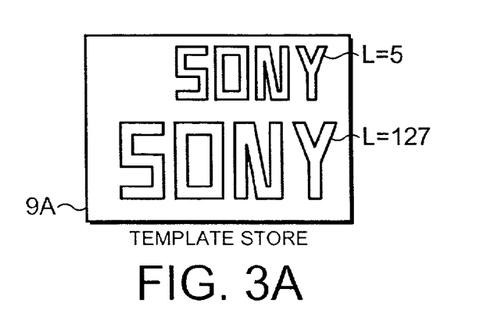
FIGS. 3A and 3B schematically illustrate the contents of frame stores of the system of FIG. 1.

Referring to FIG. 3A and to FIG. 13, the form of the watermark is defined by a bit map stored in a frame store 9a of the change processor 7. The bit map contains data selecting the DCT blocks in which coefficients are to be changed to apply the watermark. For example a bit value #0 $in a location on the store 9A indicates the a DCT block in a corresponding location in the image is not to be changed whereas bit value 1 selects the block for change.

In a preferred embodiment there are two such stores. One selects DCT blocks in which AC coefficients are to be changed and the other selects blocks in which the DC coefficient is to be changed. Most preferably the selections made by the two stores are independent. The stores 9 are referred to hereinafter as template stores. The following description assumes that DC coefficients are processed differently to AC coefficients. In an alternative embodiment only DC coefficients are changed to apply a watermark. In a further embodiment only AC coefficients are changed to apply a watermark.

Figure 3B:
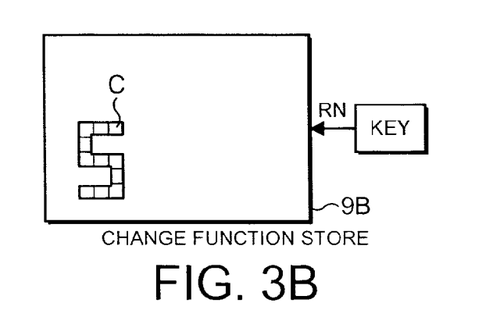

For ease of explanation and ease of illustration, the bit maps shown in FIGS. 3A and 3B assume that the digital samples have not been shuffled.

Figure 4:
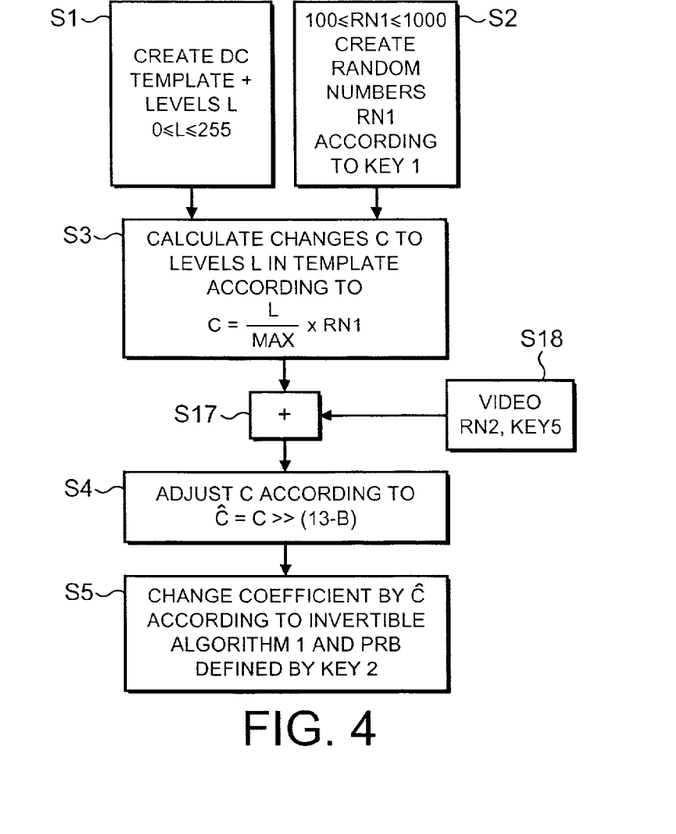
FIG. 4 is a flow chart illustrating the processing of DC transform coefficients.
Figure 5:
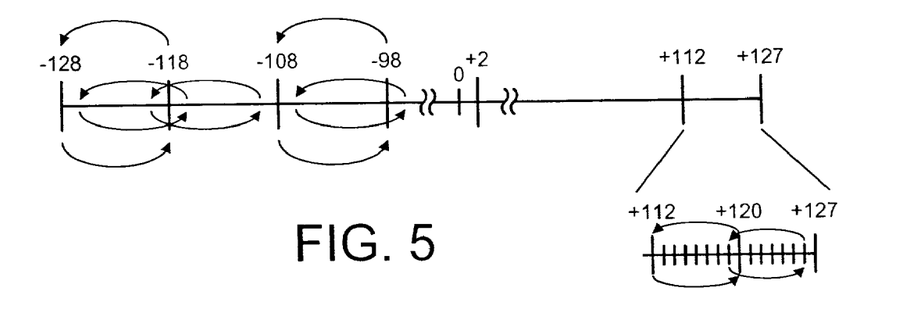
FIG. 5 illustrates the encoding of DC coefficient values.

Processing DC Coefficients, FIGS. 4 and 5

Referring to FIG. 3B, the change processor 7 has a change function store 9B which stores a change value C for the DC coefficient of each DCT block selected by the bit map in the DC template store 9A.

Referring to FIG. 4, the change value C is calculated by the processor 7 in the following way.

S1. The DC template of FIG. 3A is created. Different levels L may be specified for different parts of the watermark as illustrated in FIG. 3A. L is defined by a 8 bit number and so it has values in the range 0 to 255. In FIG. 3A L has values 5 and 127 by way of example for different parts of the template. The levels may be stored in the DC template.

S2. Pseudo random numbers RN1 are generated based on a first key, Key1. The numbers RN1 are constrained within a predetermined range min<=RN1<=max for example 100<=RN1<=1000. A new random number is generated for each DCT block which is to have its DC value changed (as indicated by the DC template).

S3. The change values C are calculated according to

C=(L/M). RN1 where M is the maximum value which L can take: in this example M=255. The change values are stored in the change store 9B.

It will be recalled that the same process occurs in both the even sample change processor 7e and the odd one 7o. However, the quantisation scales applied to the odd and even channels may be different. Thus different changes could be applied to even and odd samples. That would produce a striped image. If a striped image is not wanted, step S4 is implemented but step S4 is not essential to the invention.

Steps S1 to S3 may take place before an image is compressed and watermarked. The adjustment of the change values C by step S4 takes place during compression processing because it depends on the particular quantisation scales applied to the odd and even samples during such processing.

S4. The digital change value C is adjusted as follows to produce an adjusted value C^ where C^=C>>(13−B), where B is the number of bits needed to specify the DC magnitude after quantisation, and >>means right shift in this case (by (13-B) bits). That occurs in both the odd and even channels and results in approximately the same change being applied in both channels. There may be different values for B on the odd and even tracks Bo and Be. 13 is the number of magnitude bits of a signed 14 bit number, the extra bit being a sign bit.

S5. The quantised DC coefficients are then adjusted by the values C^ according to an invertible algorithm. The quantised DC coefficients each have n bits, where n may differ from DC coefficient to DC coefficient. The change is such that for any coefficient the number n of bits does not change.

FIG. 5 illustrates a currently preferred algorithm (algorithm 1)for changing the DC coefficient values. Assume by way of example that C^=10 and n=8 bits so the coefficient has a value in the range −128 to +127. Starting at −128, the bottom of the range, the range of values is divided into sections each of range 2×10. Sections −128 to −109; −108 to −89; and so on to +111 are shown. The whole range does not divide into an integer number of sections each of range 2×10. Thus there is a top section of +112 to +127.

The algorithm operates by swapping a value in the top half of a section with a value in the bottom half. Thus values −128 to −119 swap with values −118 to −109. Thus if a coefficient has an original value −118 , before adjustment by C^=10, it is replaced by −128 after adjustment by C^. As another example if an original value is −107, it becomes −97 after adjustment. In the top section +112 to +127 the same process occurs but the half sections are +112 to +119 and +120 to +127 and the swapping is as shown in the Figure.

The example given divides the whole range into sections beginning at the bottom (−128) of the range. The division may take place starting at the top (+127) of the range. In a preferred embodiment, the division begins at the top or bottom according to the value of a pseudo randomly generated bit PRB generated based on a key, Key2. PRB may pseudo randomly change for every DC coefficient. The values of the bit PRB are preferably stored in the change store together with C.

When a quantised DC coefficient is produced by the quantiser Q, the processor 7 determines from the change store the value of C applicable to the coefficient and the value of PRB. The processor 7 adjusts the value of C to C^. The value of that coefficient is adjusted according to C^ and the algorithm. Using the example of FIG. 5, if the coefficient has an original value of −96 it is replaced by −106.

In summary, the n bit numbers representing the coefficients are members of a set and a said number is modified by transposing it with another member of the set chosen according to the invertible algorithm. As shown in FIG. 5, if a number N1 is to be changed by an amount X it is transposed with another member N2 of the set where |N1−N2|=X, except at one end of the range where only a change of less than X is possible.

It will be appreciated from the foregoing that the number of bits is not changed.

S17, S18. The foregoing description may apply to a single frame of a still image. For video with many frames in a clip, the change values C and PRB stored in the store 9B are applied to all the frames in the clip. However in addition, to increase security, a small pseudo random variation RN2 based on a key Key5 is added to the change values C of each frame. The small variation is chosen so that the number of bits does not increase. At step S3, the change store is established and remains fixed for the clip. The small variation is a small pseudo random number e.g. −50<=RN2<=50, and it is added to C just prior to step S4. Each C gets a new value of RN2. The PRBS generating RN2 is not reset every frame, so different frames have different sequences of RN2.

Processing AC Coefficients, FIGS. 6 to 9

Figure 6:
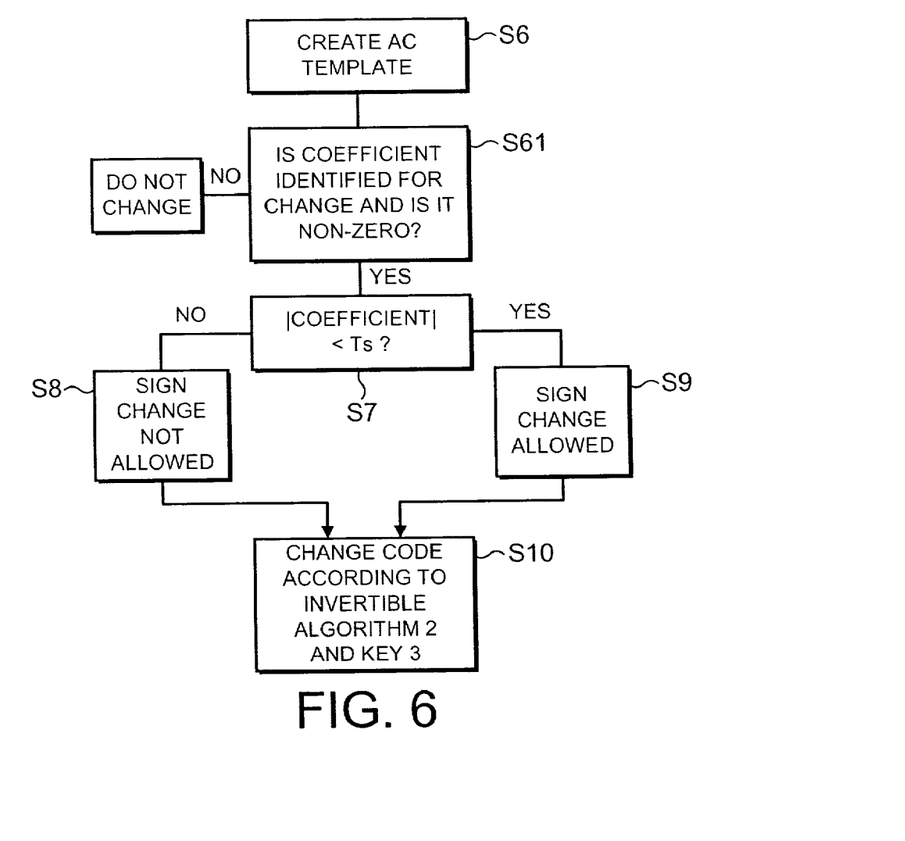
FIGS. 6, 7, 8 and 9 are flow charts illustrating the processing of AC transform coefficients.

S6. An AC template is created. The bit map in the AC template selects the DCT blocks in which AC coefficients are to be changed.

S61. If an AC coefficient is to be changed its value is tested; if it equals zero, no change is made to its value; otherwise it is changed.

S7, S8 and S9. The AC coefficients in the selected blocks are compared with a threshold Ts. If the magnitude of a coefficient is below Ts then its sign may be changed. If the value is greater than Ts the sign must not change. Although it is not essential to the principle of the invention to prevent a sign change in an AC coefficient, it has been found that a sign change for large valued coefficients creates a watermark which is unpleasant.

S10. The numbers representing the AC coefficients are changed according to an invertible algorithm and a key, Key3.

Figure 7:
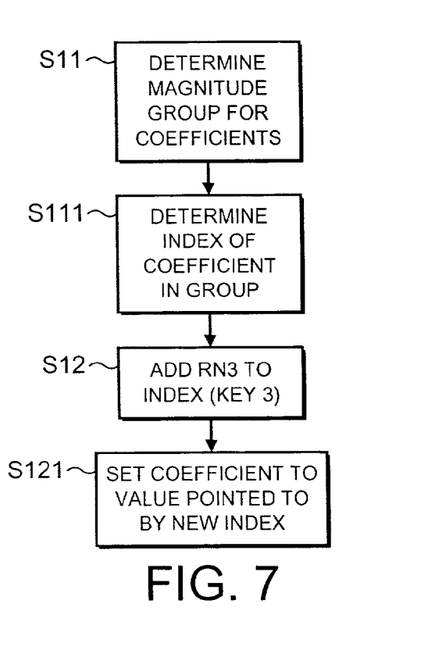

FIG. 7 illustrates one example of the invertible algorithm (algorithm 2). The algorithm operates on quantised AC coefficients prior to entropy encoding.

Referring to Table 1, which is a Huffman encoding table and which is attached to the end of this description, the coefficient values are represented by a variable length code VLC and a fixed length code FLC. The VLC specifies which of the groups an AC coefficient lies in. The FLC is an index which indicates which value in the group is equal to the AC coefficient Step S11 determines which group the coefficient lies in.

Step S111 determines the index of the coefficient in the group.

In step S12 the fixed length code of AC coefficients in blocks selected by the AC template is changed by adding to it a pseudo random number RN3 based on a key, Key3. To ensure that the number of bits does not change the sum "wraps round". For example if the fixed length code is 110 and the RN3 is 010 then the sum wraps round to 000 rather than 1000. If no change of sign is to occur as indicated by steps S7 and S9, then the wrap around is performed so as to preserve the sign of the coefficient.

In Step S121 the coefficient value is set to the value pointed to by the new index.

Figure 8:
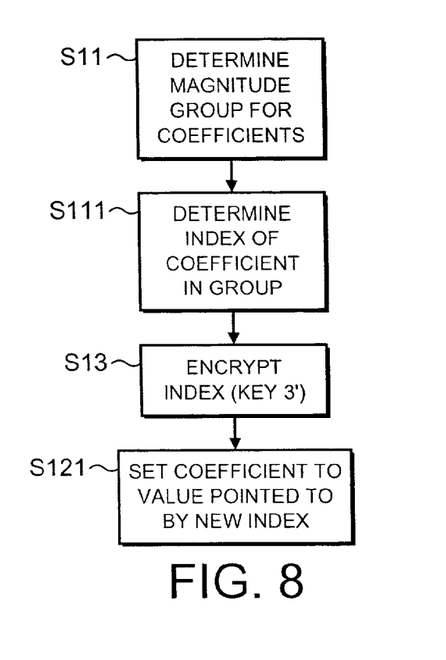

FIG. 8 illustrates another example of the invertible algorithm. The algorithm operates in the same way as FIG. 7 except step S12 is replaced by step S13.

In step S13 the fixed length code is encrypted according to an invertible encryption code and a key Key3'. The number of bits is not changed.

FIGS. 7 and 8 are concerned with changing the value of a coefficient to another value in the same magnitude group.

Figure 9:
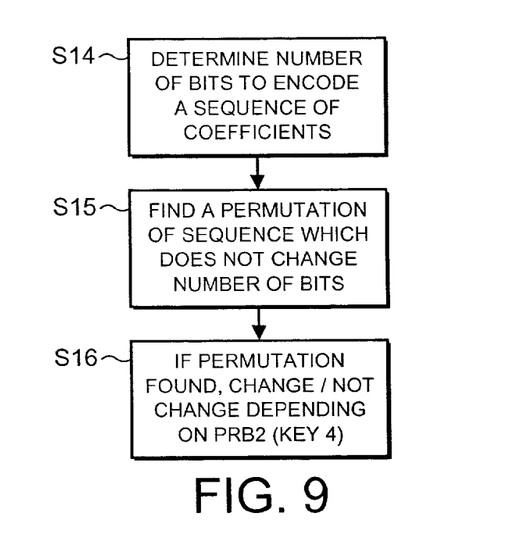

FIG. 9 illustrates an invertible algorithm for changing the order of coefficients. This may be used in addition to the algorithm of FIG. 7 or 8.

S14. The number of bits to entropy encode a sequence of AC coefficients is determined.

S15. The change processor 7 attempts to find a permutation of the order of coefficients which does not change the number of bits produced by entropy encoding.

S16. If a permutation is found, then a decision is made to either change the order or not change the order. The decision depends on the value of a pseudo random number PRB2 defined by a key Key4. In this example the number may have only one bit.

In a modification of step S15, the change processor finds more than one permutation of the order of coefficients which does not change the number of bits produced by entropy encoding. The permutations, including the original order of coefficients are numbered to identify them. In step S16, one of the permutations is selected on the basis of the pseudo random number PRB2.

In a modification of the process, the AC coefficients in a block are selected for change. In such a block not all coefficients are changed. The selection may be a preset fixed selection or a selection which varies. The selection may be pseudo random based on a key.

Creating Watermarked Spatial Domain Images

The compressed watermarked image may be stored in compressed form on the tape. To view the image it must be decompressed.

Figure 11:
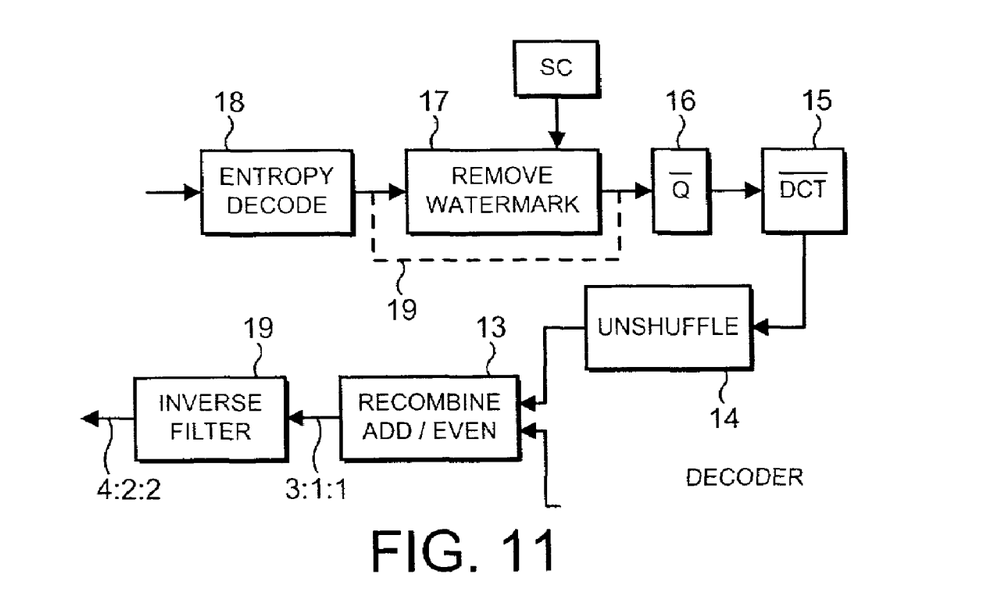
FIG. 11 is a schematic block diagram of a decoder embodying the invention.

Referring to FIG. 11, the Figure shows only the "odd" channel of the decoder. The "even" channel is similar. The compressed image is entropy decoded (18), dequantised (16) and inverse transformed (15). The resulting spatial domain samples are unshuffled (14) and the odd and even samples remultiplexed (13) to produce a watermarked spatial domain image. The remultiplexed samples are inverse filtered (12) to produce a 4:2:2 image. FIG. 13 is an example of such an image.

It will be noted that a watermark removal processor 17 of FIG. 11 is bypassed by bypass 19 for the purpose of viewing the watermarked image.

Removing the Watermark

Figure 10:
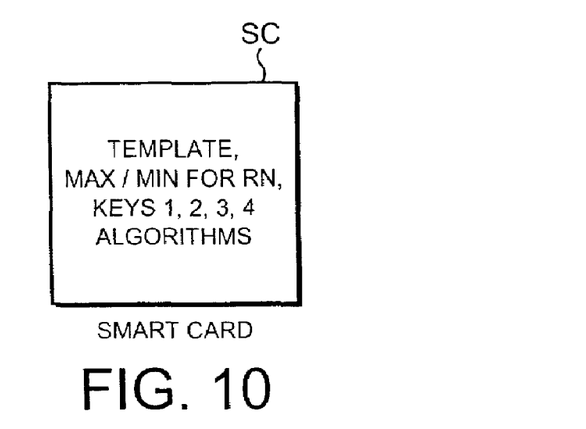
FIG. 10 is a schematic diagram of a smart card.

Data Carrier, FIG. 10

In order to remove the watermark, the decoder must have the following removal data:

The AC and DC templates, levels L, the maximum and minimum values for RN1, the keys 1, 2, 3, 4 and 5 for generating the pseudo random numbers and bits, the algorithms 1 and 2 and the threshold Ts. The keys are generated in the encoder and are not predetermined.

In the currently preferred embodiment, the removal data is stored in a data carrier preferably securely. Most preferably the carrier is a smart card SC. The encoder has an interface via which the change processors 7e and 7o download the removal data into the smart card SC.

The removal processors 17 of the decoder have a similar interface for receiving the removal data from the smart card SC.

Removal of Changes from the DC Coefficients

Referring to FIGS. 4 and 11, the removal processor 17 downloads the DC template, Key1 and the limits to the range of RN1 from the smart card SC.

S1. The templates and levels L are available from the smart card.

S2. The removal processor 17 recreates, from the Key1 and the limits, the pseudo random numbers RN1.

S3. The changes C are recalculated from the template, L and RN1. and stored in a change store as shown in FIG. 3B.

S4. The adjusted change values C^ are calculated from the stored values of C.

S5. The DC coefficients are restored to their original values by inverting the algorithm with reference to the pseudo random bits PRB1 regenerated from Key2.

S17, S18. For video clips, RN2 is regenerated from Key5 and subtracted from C.

Restoring AC Coefficients

Figure 12:
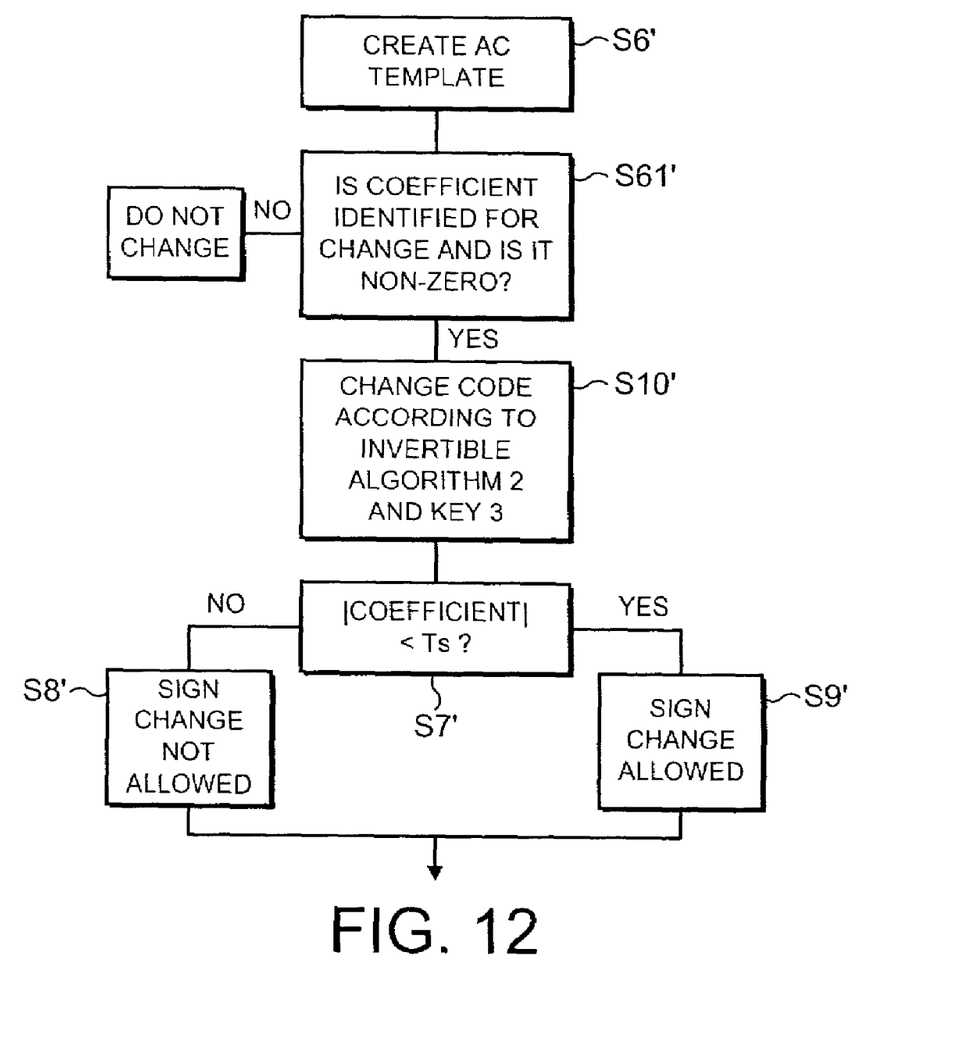
FIG. 12 is a schematic flow diagram corresponding to FIG. 6 illustrating The restoration of AC coefficient values.

Referring to FIG. 12

S6'. The AC template is downloaded from the smart card.

S61'. If an AC coefficient is to be changed, the coefficient is tested to determine whether or not it has a value of zero. If the value is non zero then it is subject to change at the encoder and thus also at the decoder.

S10'. The AC coefficients are restored to their original values by inverting the algorithm with reference to Key 3.

S7' to S9'. The coefficient values are compared with Ts downloaded from the smart card. That allows the processor to determine which coefficients have a sign change.

Referring to FIGS. 7 and 8, steps S11 and S111 are followed as in the process of changing the coefficients.

Referring to FIG. 7, at S12 RN3 is regenerated from Key3 and is subtracted from the index.

Referring to FIG. 8, at S13, the encryption is reversed using Key3'.

Referring to FIG. 9;–

S14. The number of bits to entropy encode a sequence is determined.

S15. The change processor 7 attempts to find a permutation of the order of coefficients which does not change the number of bits required to be entropy encoded.

S16. If such a permutation is found, then it is possible that in the change process a decision was made to change the order. The decision depends on the value of the pseudo random number PRB2 defined by Key4.

PRB2 indicates whether the sequence has been changed. If it has, the change is inverted.

Security

The algorithms used to apply the watermark may be common to many different users. Security is provided by:
a) the keys Key1, 2, 3, 4 and 5 which are chosen and generated by the users;
b) the levels L which are chosen by the users; and
c) the limits on RN1 which are chosen by the users.

The sign change threshold may provide some security because it is selectable by the users.

The DC and AC templates are not secure if a visible watermark is applied to an image because the template is a least partially visible in the image.

Smart cards are physically and logically designed to store data securely.

Related System and Method

The method and apparatus described herein may be used with the method and system disclosed in copending application 0029851.3, attorney file P/10406, I-00-153 the disclosure of which is incorporated herein by reference.

Adding a Watermark to Video Which has Previously Been Compressed

Figure 14:
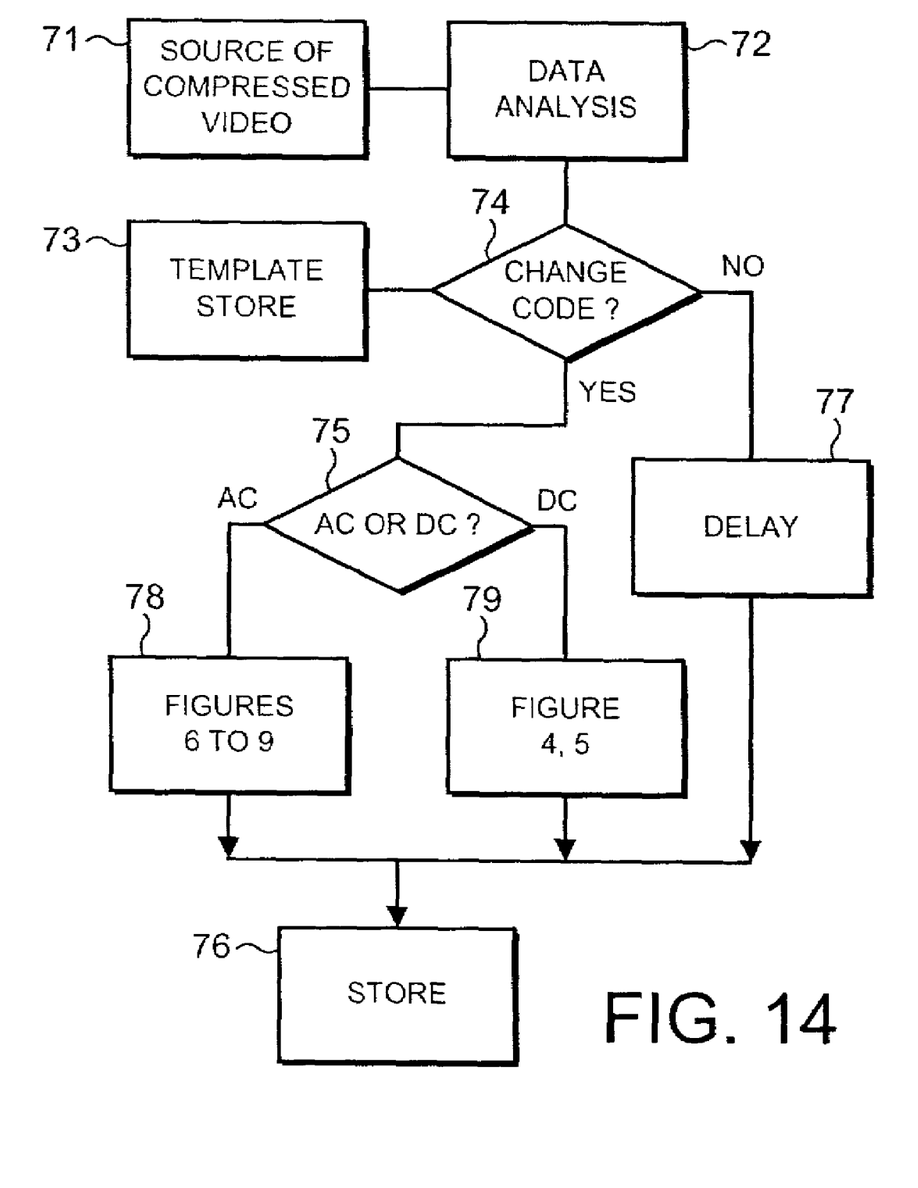
FIG. 14 is a schematic flow diagram of an illustrative system in accordance with the invention for processing video from a source of compressed video.

The foregoing description applies a watermark to video during the process of compressing the material. However material is available which is compressed but does not have a watermark but it is desirable to add a watermark to it. FIG. 14 is a schematic flow diagram of an illustrative system in accordance with the invention for processing video from a source 71 of compressed video. The source 71 may be a video tape player or player and recorder, a disc player or player and recorder, a server or any other source. For ease of explanation, and consistency with the foregoing description, it is assumed that the video has been compressed by a system as shown in FIG. 1 but omitting the change processors 7e and 7o. The compressed video thus is not watermarked.

In this example, the compressed video comprises data encoded according to the coding set out in Table 1 at the end of this description. The data is analysed (72) to:
1) extract the individual codes. The non-zero AC coefficients each have the form <VLC> <FLC> as shown in Table 1. DC coefficients are encoded as raw data in n bits;
2) determine the positions in the bit map of FIG. 3 which the codes represent; and
3) determine other information such as quantisation level of DC coefficients.

The entropy encoded bit stream is a stream of data organised in known manner and from which it is possible to identify the codes in known manner. The ordering of the codes is in a known relationship to the image positions.

A comparator 74 compares the code positions with the bit map stored in a template store 73 to determine whether the code needs to be changed or not.

If a code needs to be changed then step 75 determines whether the code represents an AC or DC coefficient. If the code represents an AC coefficient, then one of the methods of FIGS. 6 to 9 as described above is used. If the code represents a DC coefficient, then the method of FIG. 5 as described above is used.

All the codes, that is both the changed and unchanged codes are stored in a store 76, for example a video tape recorder. The unchanged codes are fed to the store 76 via a delay 77 which compensates for the processing delay of the changed codes so that the order of the codes is unchanged in the examples of FIGS. 7 and 8.

If a compressed bit stream is required then the bitstream is stored in a store 76 without further processing. If an uncompressed bit stream is required the bitstream is decompressed and then stored.

This process for embedding a watermark in video which is already compressed is advantageous because it does not require the video to be decompressed: that is it does not need to be dequantised and does not need an inverse transform operation.

Removing the Watermark

The watermark may be removed and the original video restored by the inverse of the method shown in FIG. 14. The data from a source 71 is analysed (72) to:
a) extract the individual codes. The non-zero AC coefficients each have the form <VLC> <FLC> as shown in Table 1. DC coefficients are encoded as raw data in n bits;
b) determine the positions in the bit map of FIG. 3 which the codes represent; and
c) determine other information such as quantisation level of DC coefficients.

The entropy encoded bit stream is a stream of data organised in known manner and from which it is possible to identify the codes in known manner. The ordering of the codes is in a known relationship to the image positions.

A comparator 74 compares the code positions with the bit map stored in a template store 73 to determine whether the code was changed or not during embedding If a code was changed then step 75 determines whether the code represents an AC or DC coefficient. If the code represents an AC coefficient, then one of the methods of FIGS. 12 and 7 to 9 as described above is used to remove the modification. If the code represents a DC coefficient, then the method of FIG. 5 as described above is used for removal.

All the codes, that is both the changed and unchanged codes are stored in a store 76, for example a video tape recorder. The unchanged codes are fed to the store 76 via a delay 77 which compensates for the processing delay of the changed codes so that the order of the codes is unchanged in the examples of FIGS. 7 and 8.

If a compressed bit stream is required then the bitstream is stored in a store 76 without further processing. If an uncompressed bit stream is required the bitstream is decompressed and then stored.

Modifications

Although the invention has been described by way of example with reference to information signals recorded on tape, any other suitable storage media may be used, for example, disc stores and solid state stores.

In the examples of FIGS. 1 to 14, the video is compressed according to one particular example of a compression system. The invention is not limited to that one example. The invention may be applied to many other compression systems including HDCAM, MPEG, JPEG, Motion JPEG, and DV.

In the examples of FIGS. 1 to 13, the watermark is fixed in image space and, except for the minor variation provided in video by RN2 in the example of FIG. 4, does not vary in time. The invention is not limited to that. The watermark may vary in image space with time in a video sequence. One way of doing that is to provide a plurality of bit maps (also referred to herein as templates) which define watermarks in different positions and to use the bit maps in succession. Also the different bit maps may define different levels L: see FIG. 3B and step S1 of FIG. 4, so that the watermark has a varying level of visibility with time.

JPEG is mentioned above as an example of a compression system to which the invention may be applied. The examples of the invention aim to embed a watermark in compressed digital information signals without increasing the number of bits used to represent the compressed information signals as compared to the same compressed information signals without the embedded watermark. If the examples of the invention are applied to JPEG, there may be a small change in the number of bits. This is because JPEG uses predetermined control characters which may be accidentally produced by application of the examples of the present invention. If this happens the JPEG algorithm automatically adds an extra byte to avoid this problem. The result may be to increase or decrease the number of bits. Also, to make the modification more visible, a small increase in the number of bits may be acceptable, especially when stored on discs and other non-tape formats.

Although the foregoing description refers to video, the invention is not limited to video. It may be applied to audio, still images and other information signals.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

TABLE 1

| VLC Group | Number of FLC Bits | Description |
| --- | --- | --- |
| 0 | 0 | EOB code |
| 1 | 1 | (1)*0, +/− 1 |
| 2 | 2 | (2 to 3)*0, +/− 1 |
| 3 | 3 | (4 to 7)*0, +/− 1 |
| 4 | 4 | (8 to 15)*0, +/− 1 |
| 5 | 5 | (16 to 31)*0, +/− 1 |
| 6 | 6 | (32 to 63)*0, +/− 1 |
| 7 | 0 | (1)*0 |
| 8 | 1 | (2 to 3)*0 |
| 9 | 2 | (4 to 7)*0 |
| 10 | 3 | (8 to 15)*0 |
| 11 | 4 | (16 to 31)*0 |
| 12 | 5 | (32 to 63)*0 |
| 13 | 1 | +/− 1 |
| 14 | 2 | −3 to −2, +2 to +3 |
| 15 | 3 | −7 to −4, +4 to +7 |
| 16 | 4 | −15 to −8, +8 to +15 |
| 17 | 5 | −31 to −16, +16 to +31 |
| 18 | 6 | −63 to −32, +32 to +63 |
| 19 | 7 | −127 to −64, +64 to +127 |
| 20 | 8 | −255 to −128, +128 to +255 |
| 21 | 14 | −8192 to −256, +256 to +8191 |

In this table:
1. (x to y)*0, +/− 1 means from "x" to "y" zero value coefficients followed by a coefficient of +1 or −1
2. (x to y)*0 means from "x" to "y" zero value coefficients.

We claim:

1. A method of modifying material represented by information signals, comprising:
   deriving digital representations of transform coefficients of the information signals; and
   modifying and entropy encoding said digital representations,
   wherein at least some of said digital representations are modified by making pseudo random changes to the digital representations in accordance with a substantially invertible algorithm, which changes do not substantially change the number of entropy encoded bits, the substantially invertible algorithm being applied by the method of modifying the material to the effect of defining a group of the said representations and transposing pseudo randomly said representations in said group by determining whether one or more transpositions of the representations of the group exist which do not increase the number of entropy encoded bits and selecting the, or one of the, transposed groups or the untransposed group in accordance with a value of a pseudo random number.

2. A method according to claim 1, wherein said modifications do not represent intelligible data.

3. A method according to claim 1, wherein said transform coefficients are quantised.

4. A method according to claim 1, wherein said changes are perceptible by a human viewer in the material.

5. A method according to claim 1, which comprises: defining, for each representation, a set of representations of similar magnitude of which that representation is a member; and a member of a set to be modified is modified by pseudo randomly transposing that member with another member of the set in accordance with a predetermined transposition algorithm, thereby to modify the material without substantially changing the number of entropy encoded bits.

6. A method according to claim 5, wherein if a representation of value N1 is to be changed by an amount X, it is transposed with another member of value N2 of the set where |N1−N2|=X, and X is a pseudo random value selected according to the invertible algorithm.

7. A method according to claim 6, wherein a said set comprises members whose maximum and minimum values differ by about 2X.

8. A method according to claim 6, wherein X is dependent on a proportion P, where 0<=P<=1, of the value of a pseudo random number RN1 where the proportion P equals a value L/M where L represents a predetermined, selected, level and M equals the maximum allowable value of L.

9. A method according to claim 8, wherein X is varied in dependence on a pseudo random number RN2.

10. A method according to claim 5, wherein a representation comprises a group code indicating the magnitude group of the representation, and an index code indicating the position of the representation in the group and the representation is transposed by replacing the index code of the representation by another index code in the same group and chosen pseudo randomly according to the invertible algorithm.

11. A method according to claim 1, wherein the deriving step comprises receiving digital representations of samples of the material, and applying a transform thereto to derive transform coefficients, and quantising the transform coefficients.

12. A method according to claim 1, wherein the deriving step comprises receiving an entropy encoded bitstream representing transform coefficients and extracting from the bitstream codes which represent the coefficients.

13. A method according to claim 1, comprising the step of selecting a part or parts of the material which is to be modified.

14. A method according to claim 13, comprising storing a bit map of the part or parts of the material which are to be modified and selecting a part or parts to be modified in accordance with the map.

15. A method according to claim 14, wherein if a representation of value N1 is to be changed by an amount X, it is transposed with another member of value N2, where |N1−N2|=X, and X is a pseudo random value selected according to the invertible algorithm, and X is dependent on a proportion P, where 0<=P<=1, of the value of a pseudo random number RN1 where the proportion P equals a value L/M where L represents a predetermined, selected, level and M equals the maximum allowable value of L wherein the bit map stores one or more values of the level L.

16. A method according to claim 15, wherein the bit map stores different values of L for different parts of the material.

17. A method according to claim 13, wherein the coefficients are grouped in blocks, the selecting step comprising selecting blocks of coefficients the representations of which are to be changed.

18. A method according to claim 17, wherein the blocks each comprise DC and AC coefficients and the selecting step selects AC coefficients for change in some blocks and DC coefficients for change in other blocks.

19. A method according to claim 18, wherein DC coefficients are modified differently to AC coefficients.

20. A method according to claim 1, wherein the said transform coefficients are DCT coefficients.

21. A computer program product providing computer executable instructions, which when loaded onto a data processor configures the data processor to operate according to the method of claim 1.

22. A method of removing modifications applied to information signals representing material by the method of claim 1, comprising:
deriving entropy encoded digital representations of the transform coefficients;
extracting codes representing the group of the digital representations which have been pseudo randomly transposed and applying the inverse of the invertible algorithm to the codes to reverse the transpositions of the selected members of the group, by determining whether one or more transpositions of the representations of the group exist which do not increase the number of entropy encoded bits; and
selecting the, or one of the, transposed groups or the untransposed group in accordance with the value of a pseudo random number.

23. A method according to claim 22, wherein the said digital representations are quantised transform coefficients.

24. A method according to claim 22, wherein the pseudo random number is derived from a key.

25. A method according to claim 22, of removing modifications that had been applied, comprising the steps of:
defining, for each modified representation, a set of representations of similar magnitude of which that representation is a member; and
changing, a member of a set to be restored to its unmodified value, by pseudo randomly transposing that member with another member of the set in accordance with the inverse of the said predetermined transposition algorithm.

26. A method according to claim 25 wherein if a representation of value N1 is to be changed by an amount X, it is transposed with another member of value N2 of the set where |N1−N2|=X, and X is a pseudo random value selected according to the said inverse algorithm.

27. A method according to claim 26, wherein a said set comprises members whose maximum and minimum values differ by about 2X.

28. A method according to claim 26, wherein X is dependent on a proportion P, where 0<=P<=1, of the value of a pseudo random number RN1 where the proportion P equals a value L/M where L represents a predetermined, selected, level and M equals the maximum allowable value of L.

29. A method according to claim 28, wherein X is varied in dependence on a pseudo random number RN2.

30. A method according to claim 25, wherein a representation comprises a group code indicating the magnitude group of the representation, and an index code indicating the position of the representation in the group and the representation is transposed by replacing the index code of the representation by another index code in the same group and chosen pseudo randomly according to the inverse algorithm.

31. A method according to claim 22, comprising the step of determining for each representation whether it has been subject to modification by reference to data indicating the representations which have been modified and selecting for change those representations which were modified.

32. A method according to claim 31, wherein the said data is a bit map.

33. A method according to claim 32, wherein if a representation of value N1 is to be changed by an amount X, it is transposed with another member of value N2, where |N1−N2|=X, and X is a pseudo random value selected according to the invertible algorithm, and X is dependent on a proportion P, where 0<=P<=1, of the value of a pseudo random number RN1 where the proportion P equals a value L/M where L represents a predetermined, selected, level and M equals the maximum allowable value of L wherein the bit map stores one or more values of L.

34. A method according to claim 33, wherein the bit map stores different values of L for different parts of the material.

35. A method according to claim 31, wherein the coefficients are grouped in blocks, the selecting step comprising selecting blocks of coefficients the representations of which are to be changed.

36. A method according to claim 35, wherein the blocks each comprise DC and AC coefficients and the selecting step selects AC coefficients for change in some blocks and DC coefficients for change in other blocks.

37. A method according to claim 36, wherein DC coefficients are changed differently to AC coefficients.

38. A method according to claim 22, wherein the said transform coefficients are DCT coefficients.

39. A method according to claim 22, comprising the step of downloading, from a data carrier, inverse change data required to remove the modification.

40. A computer program product providing computer executable instructions, which when loaded onto a data processor configures the data processor to operate according to the method of claim 24.

41. Apparatus for modifying material represented by information signals, comprising:
a processor arrangement operable to derive digital representations of transform coefficients of the information signals and to modify and entropy encode the coefficients,
wherein the processing arrangement is operable to modify the representations by making pseudo random transpositions to the digital representations in accordance with a substantially invertible algorithm, which changes do not substantially change the number of entropy encoded bits, the substantially invertible algorithm applied by the processing arrangement being operable such at a group of representations is pseudo randomly transposed by determining whether one or more transpositions of the presentations of the group exist which do not substantially change the number of entropy encoded bits and selecting the, or one of the, transposed groups or the untransposed group in accordance with the value of a pseudo random number.

42. Apparatus according to claim 41, comprising a transform processor for deriving digital representations of transform coefficients derived from the digital information signals; and a change processor for modifying, and entropy encoding, the said digital representations of the transform coefficients.

43. Apparatus according to claim 41, wherein the processing arrangement is operable to make changes which are perceptible in the material by a human viewer.

44. Apparatus according to claim 41, wherein the processing arrangement is operable to define, for each representation, a set of representations of similar magnitude of which that representation is a member, and a member of a set to be modified is modified by pseudo randomly transposing that member with another member of the set in accordance with a predetermined transposition algorithm, thereby to modify the material without substantially changing the number of entropy encoded bits.

45. Apparatus according to claim 44 wherein if a representation of value N1 is to be changed by an amount X, it is transposed with another member of value N2 of the set where |N1−N2|=X, and X is a pseudo random value selected according to the invertible algorithm.

46. A method according to claim 44, wherein a said set comprises members whose maximum and minimum values differ by about 2X.

47. Apparatus according to claim 44, wherein X is dependent on a proportion P, where 0<=P<=1, of the value of a pseudo random number RN1 where the proportion P equals a value L/M where L represents a predetermined, selected, level and M equals the maximum allowable value of L.

48. Apparatus according to claim 47, wherein X is varied in dependence on a pseudo random number RN2.

49. Apparatus according to claim 44, wherein a representation comprises a group code indicating the magnitude group of the representation, and an index code indicating the position of the representation in the group and the representation is transposed by replacing the index code of the representation by another index code in the same group and chosen pseudo randomly according to the invertible algorithm.

50. Apparatus according to claim 41, wherein the processing arrangement is operable to receive digital representations of samples of the material, and applying a transform thereto to derive transform coefficients, and quantise the transform coefficients.

51. Apparatus according to claim 41, wherein the processing arrangement is operable to a bit stream representing entropy encoded transform coefficients and to extract therefrom codes representing the coefficients.

52. Apparatus according to claim 41, wherein the processing arrangement is operable to select a part or parts of the material which is to be modified.

53. Apparatus according to claim 52, wherein the processing arrangement is operable to store a bit map of the portions of the material which are to be modified and select portions to be modified in accordance with the map.

54. Apparatus according to claim 53, wherein if a representation of value N1 is to be changed by an amount X, it is transposed with another member of value N2, where |N1−N2|=X, and X is a pseudo random value selected according to the invertible algorithm, and X is dependent on a proportion P, where 0<=P<=1, of the value of a pseudo random number RN1 where the proportion P equals a value L/M where L represents a predetermined, selected, level and M equals, the maximum allowable value of L wherein the bit map stores one or more values of L.

55. Apparatus according to claim 54, wherein the bit map stores different values of L for different parts of the material.

56. Apparatus according to claim 52, wherein the processing arrangement groups coefficients in blocks, and selects blocks of coefficients the representations of which are to be changed.

57. Apparatus according to claim 56, wherein the blocks each comprise DC and AC coefficients and the change processor selects AC coefficients for change in some blocks and DC coefficients for change in other blocks.

58. Apparatus according to claim 57, wherein DC coefficients are modified differently to AC coefficients.

59. Apparatus according to claim 41, wherein the said processing arrangement is operable to produce DCT coefficients.

60. A computer program product providing computer executable instructions, which when loaded onto a data processor configures the data processor to operate as the apparatus of claim 41.

61. Apparatus for removing modifications applied to information signals representing material by the apparatus of claim 41, comprising:

a decoder for deriving a bit stream representing entropy encoded digital representations of the transform coefficients of the modified material, and for extracting from the bitstream the group of the digital representations which have been pseudo randomly transposed and an inverse change processor for applying the inverse of the invertible algorithm by determining whether one or more transpositions of the representations of the group exist which do not substantially change the number of entropy encoded bits and selecting the, or one of the, transposed groups or the untransposed group in accordance with the value of a pseudo random number.

62. Apparatus according to claim 61, wherein the pseudo random number is derived from a key.

63. Apparatus according to claim 61 for removing modifications that had been applied, wherein the inverse change processor is operable to define, for each modified representation, a set of representations of similar magnitude of which that representation is a member, and a member of a set to be restored to its unmodified value is changed by pseudo randomly transposing that member with another member of the set in accordance with the inverse of the said predetermined transposition algorithm.

64. Apparatus according to claim 63 wherein if a representation of value N1 is to be changed by an amount X, it is transposed with another member of value N2 of the set where |N1−N2|=X, and X is a pseudo random value selected according to the said inverse algorithm.

65. Apparatus according to claim 64, wherein a said set comprises members whose maximum and minimum values differ by about 2X.

66. Apparatus according to claim 63, wherein X is dependent on a proportion P, where 0<=P<=1, of the value of a pseudo random number RN1 where the proportion P equals a value L/M where L represents a predetermined, selected, level and M equals the maximum allowable value of L.

67. Apparatus according to claim 64, wherein X is varied in dependence on a pseudo random number RN2.

68. Apparatus according to claim 63, wherein a representation comprises a group code indicating the magnitude group of the representation, and an index code indicating the position of the representation in the group and the representation is transposed by replacing the index code of the representation by another index code in the same group and chosen pseudo randomly according to the inverse algorithm.

69. Apparatus according to claim 61, wherein the inverse change processor is operable to determine for each representation whether it has been subject to modification by reference to data indicating the representations which have been modified and selecting for change those representations which were modified.

70. Apparatus according to claim 69, wherein the said data is a bit map.

71. Apparatus according to claim 70, wherein if a representation of value N1 is to be changed by an amount X, it is transposed with another member of value N2, where |N1−N|=X, and X is a pseudo random value selected according to the invertible algorithm, and X is dependent on a proportion P, where 0<P<1, of the value of a pseudo random number RN1 where the proportion P equals a value L/M where L represents a predetermined, selected, level and M equals the maximum allowable value of L wherein the bit map store one or more values of L.

72. Apparatus according to claim 71, wherein the bit map stores different values of L for different parts of the material.

73. Apparatus according to claim 69, wherein the inverse change processor is operable to group the coefficients in blocks, and to select blocks of coefficients the representations of which are to be changed.

74. Apparatus according to claim 73, wherein the blocks each comprise DC and AC coefficients and the inverse change processor is operable to select AC coefficients for change in some blocks and DC coefficients for change in other blocks.

75. Apparatus according to claim 74, wherein DC coefficients are changed differently to AC coefficients.

76. Apparatus according to claim 61, wherein the said transform coefficients are DCT coefficients.

77. A computer program product including instructions encoded on a computer readable medium having stored thereon a template defining the group of representations which have been modified by the substantially invertible algorithm according to the method of claim 1, the bit map corresponding to locations in material which have been modified, and other data required to apply the modification(s).

78. A computer program product including instructions encoded on a computer readable medium having stored thereon a template defining the group of representations which have been modified by the substantially invertible algorithm according to the method of claim 1, the bit map corresponding to locations in material which have been modified, and other data required to remove the modification(s).

79. A computer program product according to claim 77, wherein the said other data includes at least one security key for generating a pseudo random number.

80. A computer program product according to claim 79, wherein the said other data includes at least data relating to limits on a value of the pseudo random number.

81. A computer program product according to claim 77, wherein the said other data includes data relating to a magnitude of the modification(s).

82. A camera/recorder including the apparatus according to claim 41.

* * * * *